United States Patent
Takezawa

(10) Patent No.: US 8,148,018 B2
(45) Date of Patent: Apr. 3, 2012

(54) METHOD AND APPARATUS OF MANUFACTURING NEGATIVE ELECTRODE FOR NON-AQUEOUS ELECTROLYTE SECONDARY BATTERY, AND NON-AQUEOUS ELECTROLYTE SECONDARY BATTERY USING THE NEGATIVE ELECTRODE

(75) Inventor: Hideharu Takezawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1190 days.

(21) Appl. No.: 11/976,959

(22) Filed: Oct. 30, 2007

(65) Prior Publication Data

US 2008/0118842 A1  May 22, 2008

(30) Foreign Application Priority Data

Nov. 21, 2006  (JP) .................................. 2006-313788

(51) Int. Cl.
*H01M 4/58* (2010.01)

(52) U.S. Cl. .................... 429/231.95; 429/304; 429/313

(58) Field of Classification Search ............. 429/231.95, 429/304, 313
See application file for complete search history.

(56) References Cited

U.S. PATENT DOCUMENTS

| 5,395,711 | A | * | 3/1995 | Tahara et al. ................. 429/332 |
| 7,648,537 | B2 | | 1/2010 | Harada et al. |
| 2005/0214646 | A1 | * | 9/2005 | Kubota .................... 429/231.95 |

FOREIGN PATENT DOCUMENTS

| CN | 1755975 A | 4/2006 |
| JP | 6-325765 | 11/1994 |
| JP | 2005-38720 | 2/2005 |
| JP | 2005-196970 | 7/2005 |
| WO | WO 96/27910 | 9/1996 |

OTHER PUBLICATIONS

Chinese Office Action issued in Chinese Patent Application No. CN 200710188623.6 dated Mar. 23, 2010.

* cited by examiner

*Primary Examiner* — Jane Rhee
(74) *Attorney, Agent, or Firm* — McDermott Will & Emery LLP

(57) ABSTRACT

A method of manufacturing a negative electrode for a non-aqueous electrolyte secondary battery includes a step of imparting lithium to a precursor of the negative electrode capable of storing and releasing lithium, by a film forming method in a dry process. In this step, the precursor is brought into contact with a measuring terminal having a non-aqueous electrolyte and a counter electrode. The amount of lithium stored in the precursor is calculated from an open circuit potential of the precursor with respect to the counter electrode. Further, according to the calculated amount of stored lithium, the amount of lithium to be imparted to the precursor is controlled.

12 Claims, 4 Drawing Sheets

METHOD AND APPARATUS OF MANUFACTURING NEGATIVE ELECTRODE FOR NON-AQUEOUS ELECTROLYTE SECONDARY BATTERY, AND NON-AQUEOUS ELECTROLYTE SECONDARY BATTERY USING THE NEGATIVE ELECTRODE

BACKGROUND OF THE INVENTION

1. Field of the Invention

The present invention relates to a method and apparatus of manufacturing a negative electrode for a non-aqueous electrolyte secondary battery, and particularly to a technique suitable for mass production for controlling an amount of lithium to be stored in the negative electrode so that the irreversible capacity thereof can precisely be compensated for.

2. Background Art

The development of applications of a non-aqueous electrolyte secondary battery using lithium as main power supply for various kinds of devices is proceeding because of a large theoretical capacity of lithium. Under circumstances where further increases in the capacity is required, for the negative electrode active material, changeover is intended from carbon materials, e.g. graphite, having a theoretical capacity lower than 400 mAh/g to silicon- or tin-containing materials having a theoretical capacity of substantially ten times.

Substantially all the negative electrode active materials containing carbon material have a capacity loss caused by non-dischargibility (irreversible capacity) in the initial charge/discharge. In particular, it is known that large-capacity materials containing silicon, tin or the like have larger irreversible capacity. It is considered that the irreversible capacity of a negative electrode active material results from deactivation of lithium caused by side reactions thereof with the components of the electrolyte solution or negative electrode active material during charging. Because the irreversible capacity resulting from the negative electrode active material finally causes a partial loss of the reversible capacity of the positive electrode, i.e. a capacity limiting electrode, the entire capacity of the non-aqueous electrolyte secondary battery is decreased.

To prevent decreases in the battery capacity resulting from the irreversible capacity, some techniques are proposed. In the techniques, an amount of lithium is added to the negative electrode active material in advance to compensate for the irreversible capacity. For example, Japanese Translation of PCT Publication No. 96/027910 discloses a method of attaching foil made of metal lithium to a negative electrode sheet of a complex oxide containing tin by rolling transfer or the like. In this method, an electrolytic solution allows the negative electrode active material to store lithium in the subsequent battery assembling step.

However, the amount of lithium to be stored in the negative electrode active material is much smaller than the amount of lithium to be imparted according to the lower limit (approximately 30 μm) of the thickness of metal lithium foil that can be handled. For this reason, the metal lithium foil is partly provided on the negative electrode in this method, and lithium cannot be stored therein uniformly. Thus, it causes expansion which deforms the negative electrode and makes the charge/discharge reaction non-uniform.

Japanese Patent Unexamined Publication No. 2005-038720 discloses a method of forming a light metal layer such as metal lithium on a mixture layer containing a negative electrode active material, using a film forming method in a dry process, such as vacuum deposition. In this method, the treated negative electrode is placed in a dry atmosphere or electrolyte solution so that lithium is stored in the negative electrode.

With this method, a lithium layer thinner than lithium foil can be formed by vacuum deposition. However, if some factors cause the thickness of the lithium layer to deviate from a predetermined value, the deviation cannot be known. In such a case, negative electrodes having a large deviation from the predetermined value are continuously produced.

Further, Japanese Patent Unexamined Publication No. H06-325765 proposes a technique for fabricating another electrochemical cell prior to the assembly of a battery, and charging the negative electrode using a counter electrode capable of releasing lithium.

With this method, the amount of lithium to be imparted to the negative electrode active material can accurately be measured from the amount of current through the electrochemical cell. However, in the method using such an electrochemical cell, continuous production is difficult. Thus, this method is unsuitable for mass production.

SUMMARY OF THE INVENTION

The present invention is directed to mass production of a negative electrode for a non-aqueous electrolyte secondary battery accurately. At the mass production, to compensate for the amount of lithium corresponding to the irreversible capacity of the negative electrode active material, the amount of lithium to be imparted to a precursor is accurately measured and controlled.

A method of manufacturing a negative electrode for a non-aqueous electrolyte secondary battery includes a step of imparting lithium to a precursor of the negative electrode capable of storing and releasing lithium, by a film forming method in a dry process. In this step, the precursor is brought into contact with a measuring terminal having a non-aqueous electrolyte and a counter electrode. The amount of lithium stored in the precursor is calculated from an open circuit potential of the precursor with respect to the counter electrode. According to the calculated amount of stored lithium, the amount of lithium to be imparted to the precursor is controlled.

By using a film forming method in a dry process, a suitable amount of lithium can uniformly be stored in the precursor of the negative electrode. However, the amount of lithium to be supplied is changed by variations in the amount of the negative electrode active material in the precursor per unit area. Furthermore, in some cases, correction is necessary because the lithium supply speed varies with fluctuation in the temperature of a lithium supply source and with decrease in the amount of lithium in the supply source. In the present invention, first, a measuring terminal including a non-aqueous electrolyte and a counter electrode is brought into contact with a precursor. The amount of lithium stored in the precursor is calculated from an open circuit potential of the precursor with respect to the counter electrode. Thus, the amount of lithium to be supplied and the amount of lithium actually stored in the precursor are obtained accurately. Next, according the actual amount of stored lithium, the amount of lithium to be imparted to the precursor is controlled. Thus, even in continuous production, the amount of lithium stored in the negative electrode active material in the precursor can be kept within a small variation range.

Additionally, the present invention does not include a complicated treatment, such as immersion of the precursor in an electrolyte solution, and thus is suitable for mass production.

The use of a negative electrode fabricated by such a manufacturing method allows production of a non-aqueous electrolyte secondary battery having large capacity, excellent cycle characteristics, and few variations in these characteristics.

DETAILED DESCRIPTION OF THE INVENTION

Figure 1:
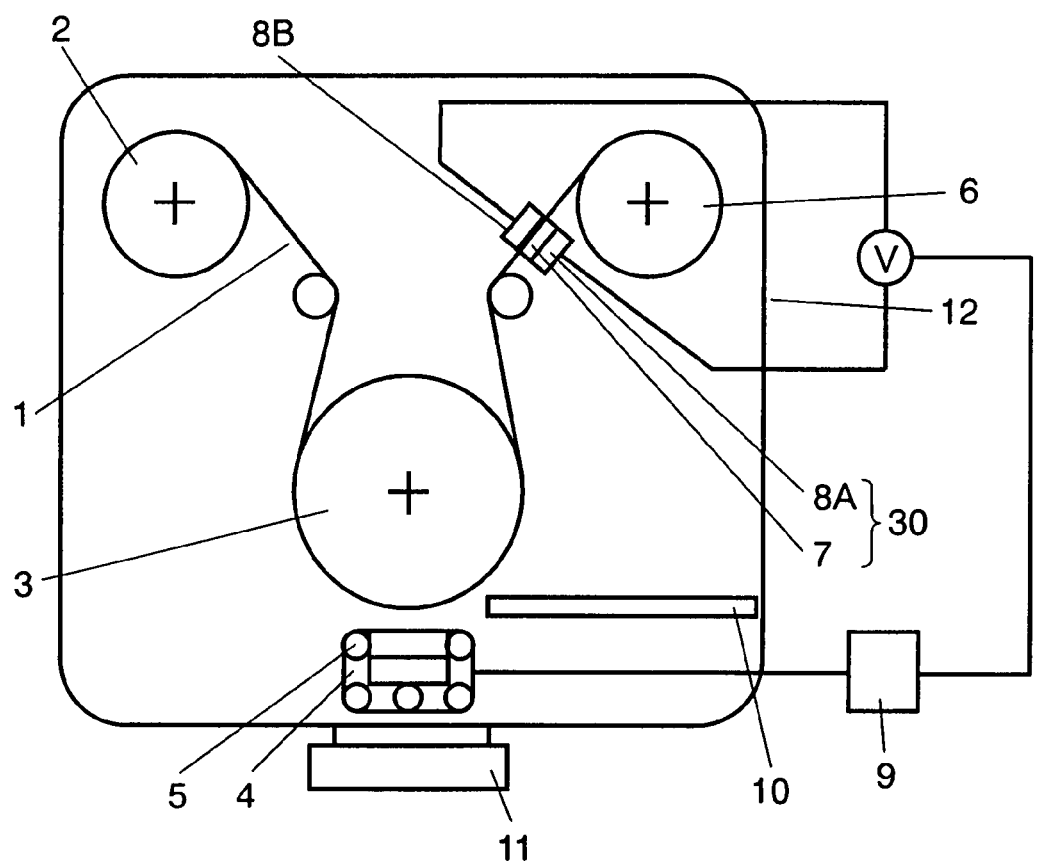
FIG. 1 is a schematic diagram illustrating an example of manufacturing apparatus for performing a method of manufacturing a negative electrode for a non-aqueous electrolyte secondary battery in accordance with an exemplary embodiment of the present invention.

FIG. 1 is a schematic diagram illustrating an example of a method of manufacturing a negative electrode for a non-aqueous electrolyte secondary battery in accordance with an exemplary embodiment of the present invention. FIG. 1 shows a step in which the inside of vacuum chamber 12 is kept under vacuum using vacuum pump 11, and lithium is imparted to precursor 1 of a negative electrode by a film forming method in a dry process (herein after referred as "a dry method") in the vacuum chamber. Precursor 1 includes an active material layer formed on a negative electrode current collector, using an active material layer forming device not shown. Such an active material layer forming device is disclosed in Japanese Patent Unexamined Publication No. 2005-196970, for example.

Precursor 1 of the negative electrode is set so that precursor 1 unwound from unwinding roll 2 is fed to winding roll 6 via film-deposition can roll 3. Directly under film-deposition can roll 3, evaporation boat 4 including heater 5 is disposed. In evaporation boat 4, a lithium metal rod, i.e. an evaporation source, is placed. By opening shutter 10 after sufficiently heating evaporation boat 4, lithium is imparted to precursor 1 on film-deposition can roll 3.

However, precursor 1 has variations in the amount of the negative electrode active material per unit area, in the manufacturing process thereof. Thus, always imparting a fixed amount of lithium to precursor 1 from evaporation boat 4 does not necessarily impart uniform lithium to precursor 1. Further, depending on vacuum conditions, a part of lithium imparted to precursor 1 changes into an inactive lithium oxide or the like. Such generation of inactive components influences the amount of lithium stored in precursor 1. Such a factor is also one of the causes for hindering uniform provision of lithium to precursor 1.

In this exemplary embodiment, precursor 1 is brought into contact with measuring terminal 30 including non-aqueous electrolyte 7 and counter electrode 8A, and substrate 8B. Then, measuring the potential of substrate 8B with respect to counter electrode 8A allows the open circuit potential of precursor 1 to be measured. According to this measurement, the amount of lithium stored in precursor 1 is calculated. Then, according to the calculated amount of stored lithium, the amount of lithium to be imparted to precursor 1 is controlled.

Figure 2:
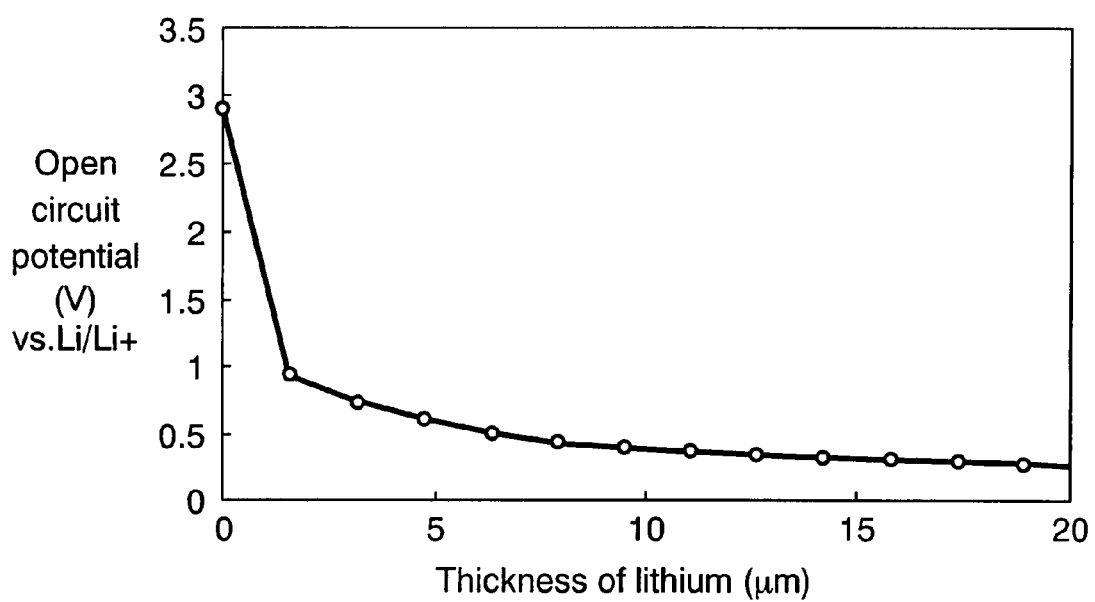
FIG. 2 is a correlation diagram showing an example of the correlation between an open circuit potential of a precursor with respect to a counter electrode measured with a measuring terminal and an actual amount of stored lithium, in accordance with the exemplary embodiment.

FIG. 2 is a correlation diagram showing an example of the correlation between an open circuit potential of precursor 1 with respect to counter electrode 8A measured with measuring terminal 30 and the actual amount of lithium stored per unit area. The amount of stored lithium is shown in terms of the thickness of lithium. For FIG. 2, a polymer electrolyte approximately 100 μm thick that contains polyethylene oxide (PEO) having an average molecular weight of one million and $LiN(CF_3SO_2)_2$ in a weight ratio of 3:1 is used as non-aqueous electrolyte 7, and lithium metal attached to this polymer electrolyte is used as counter electrode 8A. Because substrate 8B is not in contact with non-aqueous electrolyte 7, any material can be used for the substrate as long as the material is a conductor. For example, glassy carbon can be used.

When lithium is stored in the negative electrode active material constituting precursor 1, the open circuit potential with respect to counter electrode 8A tends to decrease. This tendency has high correlation as shown in FIG. 2. This open circuit potential varies with the amount of lithium stored in the negative electrode active material per unit weight. For this reason, even when a fixed amount of lithium is always imparted to precursor 1 from evaporation boat 4 in FIG. 1, the open circuit potential is changed by variations in the amount of the negative electrode active material per unit area.

In this exemplary embodiment, as shown in FIG. 1, for example, controller 9 is coupled to measuring terminal 30, substrate 8B, and heater 5 provided in evaporation boat 4. Controller 9 stores a calibration curve based on the correlation between the amount of stored lithium and the open circuit potential as shown in FIG. 2, and an open circuit potential indicated when a proper amount of lithium is stored. Controller 9 calculates the amount of lithium stored in precursor 1 from an open circuit voltage measured by measuring terminal 30. Then, when the amount of lithium stored is smaller than the proper amount, controller 9 controls heater 5 so that the temperature is increased to promote evaporation of lithium.

FIG. 1 shows an example in which controller 9 is coupled to heater 5. Alternatively, controller 9 may be coupled to the driving source of unwinding roll 2. In that structure, when the amount of stored lithium is smaller than the proper amount, controller 9 decreases the unwinding speed of unwinding roll 2. Such a structure can give the same advantage as the structure of FIG. 1. In other words, evaporation boat 4 and unwinding roll 2 constitute a film forming part in a dry process for imparting lithium by a dry method. Controller 9 calculates the amount of lithium stored in precursor 1 from an open circuit potential of precursor 1 with respect to counter electrode 8A. According to the calculated amount of stored lithium, controller 9 controls the film forming part in a dry process so that the amount of lithium to be imparted to precursor 1 is controlled.

With this structure, even in continuous production, the amount of lithium stored in the negative electrode active material in precursor 1 can be kept within a small variation range. Additionally, this method does not include a complicated treatment, such as immersion of precursor 1 in an electrolyte solution, and thus is suitable for mass production. The use of a negative electrode fabricated by such a manufacturing method allows production of a non-aqueous electrolyte secondary battery having high capacity and excellent cycle characteristics.

FIG. 1 shows measuring terminal 30 in a tabular shape.

Figure 3:
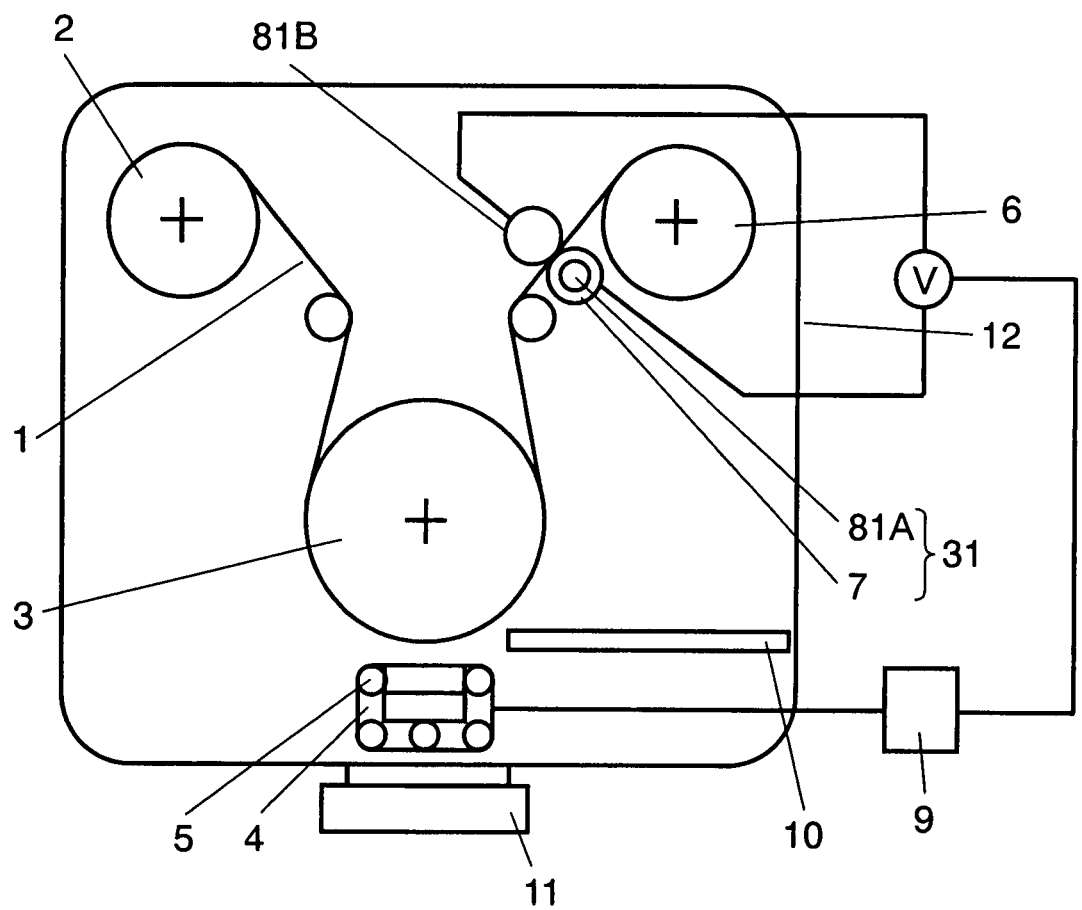
FIG. 3 is a schematic diagram illustrating another example of the manufacturing apparatus for performing the method of manufacturing a negative electrode for a non-aqueous electrolyte secondary battery in accordance with the exemplary embodiment.

However, to prevent abrasion of precursor 1 caused by the friction generated thereon, it is preferable that measuring terminal 31 and substrate 81 structured as shown in FIG. 3 are used. Measuring terminal 31 includes counter electrode 81A in a roller shape, and substrate 81B is also formed into a roller shape.

It is preferable that vacuum deposition is selected as the dry method. The dry methods include sputtering, laser ablation, and ion plating. However, vacuum deposition is preferably selected because this method can impart lithium promptly.

It is preferable that non-aqueous electrolyte 7 is made of a solid electrolyte. As non-aqueous electrolyte 7, a non-aqueous electrolyte solution that contains a lithium salt dissolved in an organic solvent and is gelled using a polymer, such as polyvinylidene-fluoride (PVDF) and polyacrylonitrile (PAN). However, when lithium is imparted to precursor 1 in a vacuum atmosphere as described above, non-aqueous electrolyte 7 made of a solid electrolyte is preferable because exhaustion of the liquid component need not be cared about.

As examples of usable solid electrolyte, a polymer electrolyte in which a lithium salt is dissolved in an organic polymer and solidified, and an inorganic lithium ion conductor can be used. Any known solid electrolyte can be used. In addition to the above polymer electrolyte containing lithium imide salt dissolved in PEO, an inorganic lithium ion conductor such as a lithium phosphate oxynitride (LiPON) can be used.

The material of counter electrode 8A to be combined with non-aqueous electrolyte 7 is not specifically limited as long as the material does not make any side reaction with non-aqueous electrolyte 7. For example, lithium metal, and such metals as Pt, Au, and stainless steel (e.g. SUS316) can be used. When an electrode other than a lithium metal electrode is used, the potential of the electrode in terms of lithium is measured in advance, and converted afterwards. The non-aqueous electrolyte can be disposed on counter electrode 8A by using a vacuum film forming method, such as vacuum deposition and sputtering, other than by processing the non-aqueous electrolyte into a sheet form as described above.

Preferably, precursor 1 includes a silicon-containing material as a negative electrode active material thereof. The use of a silicon-containing material, such as Si and a Si alloy, as the negative electrode active material can remarkably increase the capacity of the non-aqueous electrolyte secondary battery at a relatively low price.

Further, a silicon oxide expressed by $SiO_x$ ($0.3 \leq x \leq 1.3$) is preferably used as the silicon-containing material. Such a material expands less than the other silicon-containing materials during charging. Thus, a non-aqueous electrolyte secondary battery having excellent balance of characteristics can be structured.

Figure 4:
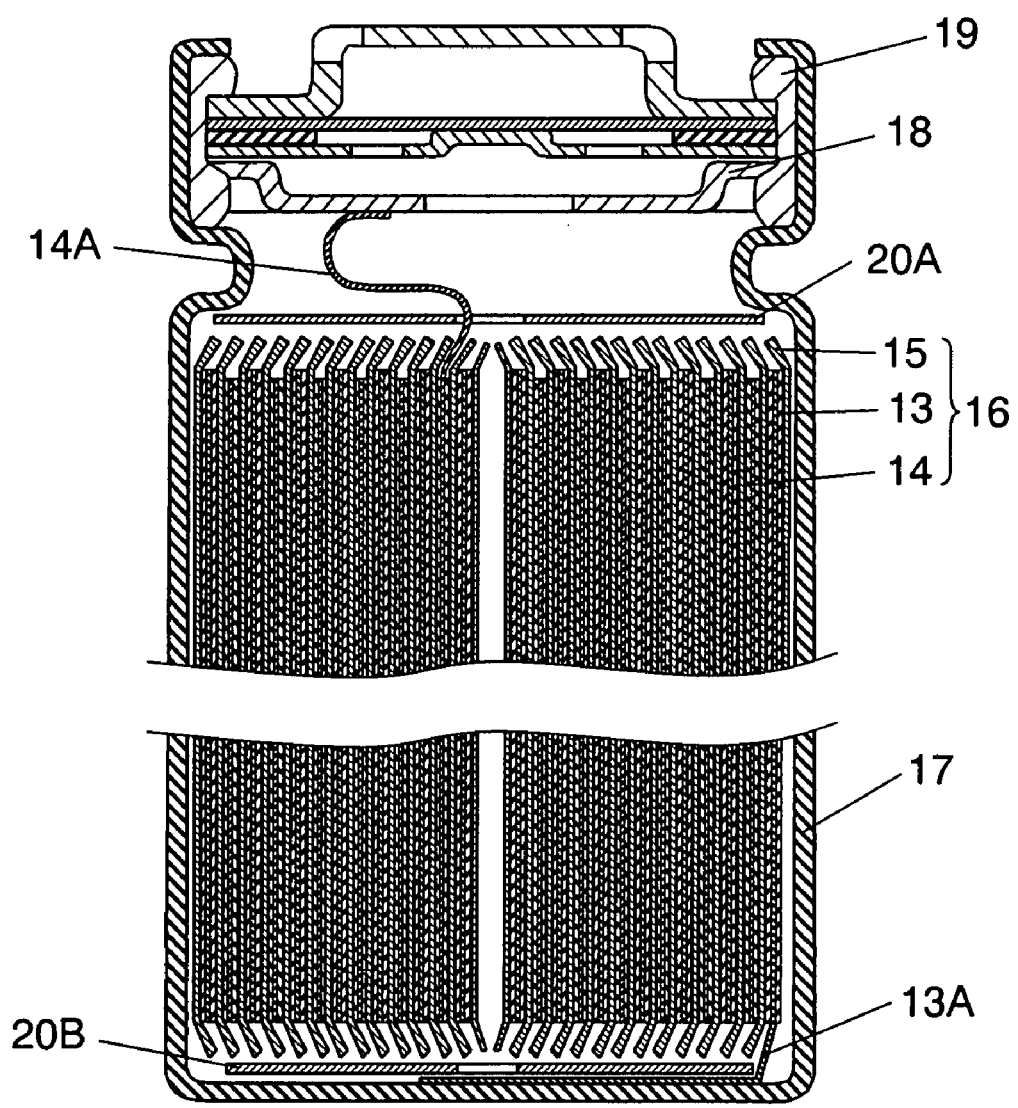
FIG. 4 is a longitudinal sectional view of a non-aqueous electrolyte secondary battery in accordance with the exemplary embodiment.

FIG. 4 is a longitudinal sectional view of a non-aqueous electrolyte secondary battery of this exemplary embodiment. This non-aqueous electrolyte secondary battery includes negative electrode 13 made of precursor 1 fabricated by the above manufacturing method, positive electrode 14, and non-aqueous electrolyte (not shown). Positive electrode 14 faces negative electrode 13 and electrochemically reduces lithium ions during discharging. The non-aqueous electrolyte has lithium ion conductivity. Negative electrode lead 13A made of copper, for example, is coupled to one end of negative electrode 13. Positive electrode lead 14A made of aluminum, for example, is coupled to one end of positive electrode 14. Negative electrode 13 is prepared in such a manner that lithium is stored in precursor 1 by the above method.

Negative electrode 13 and positive electrode 14 are wound together with separator 15 for preventing direct contact therebetween, to form electrode body 16. To the top and bottom of electrode body 16, insulating plates 20A and 20B are attached. The other end of positive electrode lead 14A is welded to sealing plate 18. The other end of positive electrode lead 13A is welded to the bottom of case 17. Then, electrode body 16 is inserted into case 17. Further, the lithium-ion conductive non-aqueous electrolyte are poured into case 17, and the opening end of case 17 is crimped to sealing plate 18 via gasket 19. Thus, the non-aqueous electrolyte secondary battery is completed. Generally, positive electrode 14 includes a positive electrode current collector and a positive electrode mixture layer containing a positive electrode active material.

The positive electrode mixture layer contains a lithium-containing complex oxide, such as $LiCoO_2$, $LiNiO_2$, $Li_2MnO_4$, a mixture thereof, or complex compound thereof, as the positive electrode active material. As other examples of the positive electrode active material, olivine-type lithium phosphates expressed by a general formula of $LiMPO_4$ (M=V, Fe, Ni, and Mn), and lithium fluorophosphates expressed by a general formula of $Li_2MPO_4F$ (M=V, Fe, Ni, and Mn) can be used. Further, a part of each of these lithium-containing compounds may be substituted with different elements. Surface treatment may be provided using a metal oxide, lithium oxide, or conductive agent. Alternatively, hydrophobic treatment may be provided on the surface thereof.

The positive electrode mixture layer further includes a conductive agent and a binder. As the materials of the conductive agent, graphite such as natural graphite and artificial graphite, carbon black such as acetylene black, Ketjen black, channel black, furnace black, lamp black, and thermal black, conductive fibers such as carbon fiber and metal fiber, fluorocarbon, metal powders such as aluminum powder, conductive whiskers such as zinc oxide whisker and potassium titanate whisker, conductive metal oxides such as a titanium oxide, and organic conductive materials such as a phenylene derivative can be used.

As the materials of the binder, PVDF, polytetrafluoroethylene, polyethylene, polypropylene, an aramid resin, polyamide, polyimide, polyamide-imide, polyacrylonitrile, polyacrylic acid, polymethylacrylate, polyethylacrylate, polyhexylacrylate, poly methacrylic acid, polymethyl methacrylate, polyethyl methacrylate, polyhexyl methacrylate, polyvinyl acetate, polyvinyl pyrrolidone, polyether, polyethersulfone, hexafluoropolypropylene, styrene-butadiene rubber, and carboxymethylcellulose can be used. As other materials usable for the binder, copolymers containing at least two kinds selected from tetrafluoroethylene, hexafluoroethylene, hexafluoropropylene, perfluoro alkyl vinyl ether, vinylidene fluoride, chlorotrifluoroethylene, ethylene, propylene, pentafluoropropylene, fluoromethyl vinyl ether, acrylic acid, and hexadiene can be used. At least two kinds selected from these materials may be mixed.

The materials usable as the positive electrode current collector of positive electrode 14 include aluminum (Al), carbon, and conductive resin. Surface treatment may be provided on any of these materials by carbon or other materials.

The materials usable for the non-aqueous electrolyte include: non-aqueous electrolyte solution containing solute dissolved in organic solvent; and a polymer electrolyte layer containing such non-aqueous electrolytic solution and defluidized by a polymer. When an electrolyte solution is used, it is preferable to use separator 15 of a nonwoven fabric or microporous membrane made of a material, such as polyethylene, polypropylene, an aramid resin, amide-imide, polyphenylene sulfide, and polyimide, between positive electrode 14 and negative electrode 13, and impregnate separator 15 with the electrolyte solution. Separator 15 may contain such heat-resistant filler as alumina, magnesia, silica, and titania, inside of or on separator 15. In addition to separator 15, a heat-resistant layer made of these fillers and a binder of the same material used in positive electrode 14 and negative electrode 13 can be provided.

The materials of the non-aqueous electrolyte are selected according to the oxidation-reduction potential of the respective active materials or the other factor. The preferable materials for the solute of the non-aqueous electrolyte are salts generally used for lithium batteries. Such salts include: $LiPF_6$; $LiBF_4$; $LiClO_4$; $LiAlCl_4$; $LiSbF_6$; $LiSCN$; $LiCF_3SO_3$; $LiCF_3CO_2$; $LiAsF_6$; $LiB_{10}Cl_{10}$; lower aliphatic lithium carboxylate; LiF; LiCl; LiBr; LiI; chloroborane lithium; various borates, such as bis(1,2-benzenediolate (2-)-O,O') lithium borate, bis(2,3-naphthalenediolate (2-)-O,O') lithium borate, bis(2,2'-biphenyldiolate (2-)-O,O') lithium borate, and bis(5-fluoro-2-olate-1-benzenesulfonic acid-O,O') lithium borate; $(CF_3SO_2)_2NLi$; $LiN(CF_3SO_2)$; $(C_4F_9SO_2)$; $(C_2F_5SO_2)_2NLi$; and tetraphenyl lithium borate.

As the organic solvent in which the above salts are dissolved, those commonly used for lithium batteries can be used. The examples of the organic solvent include the following which may be used either by itself or in combination: ethylene carbonate (EC); propylene carbonate; butylene carbonate; vinylene carbonate; dimethyl carbonate (DMC); diethyl carbonate; ethyl methyl carbonate (EMC); dipropyl carbonate; methyl formate; methyl acetate; methyl propionate; ethyl propionate; dimethoxymethane; γ-butyrolactone; γ-valerolactone; 1,2-diethoxyethane; 1,2-dimethoxyethane; ethoxymethoxyethane; trimethoxymethane; tetrahydrofuran; tetrahydrofuran derivatives such as 2-methyl-tetrahydrofuran; dimethyl sulfoxide; dioxolane derivatives such as 1,3-dioxolane and 4-methyl-1,3-dioxolane; formamide; acetamide; dimethylformamide; acetonitrile; propylnitrile; nitromethane; ethylmonoglyme; triester phosphate; acetate ester; propionate ester; sulfolane; 3-methylsulfolane; 1,3-dimethyl-2-imidazolidinone; 3-methyl-2-oxazolidinone; a propylene carbonate derivative; ethyl ether; diethyl ether; 1,3-propanesultone; anisole; and fluorobenzene.

The organic solvent may further contain an additive such as vinylene carbonate, cyclohexylbenzene, biphenyl, diphenyl ether, vinylethylene carbonate, divinylethylene carbonate, phenylethylene carbonate, diallyl carbonate, fluoroethylene carbonate, catechol carbonate, vinyl acetate, ethylene sulfite, propanesultone, trifluoropropylene carbonate, dibenzofuran, 2,4-difluoroanisole, o-terphenyl, and m-terphenyl.

The non-aqueous electrolyte may be used as a solid electrolyte by mixing one of the above solutes into at least one of the following polymeric materials: polyethylene oxide, polypropylene oxide, polyphosphazene, polyaziridine, polyethylene sulfide, polyvinyl alcohol, polyvinylidene fluoride, and polyhexafluoropropylene. Alternatively, the non-aqueous electrolyte may be used in a gel form by mixing with one of the above organic solvents. Inorganic materials can also be used as the solid electrolyte. Such inorganic materials include: lithium nitrides, lithium halides, lithium oxyacid salts, $Li_4SiO_4$, $Li_4SiO_4$—LiI—LiOH, $Li_3PO_4$—$Li_4SiO_4$, $Li_2SiS_3$, $Li_3PO_4$—$Li_2S$—$SiS_2$, and phosphorus sulfide compounds. When a non-aqueous electrolyte is used in a gel form, the non-aqueous electrolyte in a gel form may be disposed between positive electrode 14 and negative electrode 13 instead of separator 15. Alternatively, the non-aqueous electrolyte in a gel form may be disposed adjacent to separator 15.

As the current collector of negative electrode 13, metal foil made of stainless steel, nickel, copper, titanium, or the like, or a thin film made of carbon or conductive resin is used. Further, surface treatment can be provided using carbon, nickel, or titanium.

For negative electrode 13, other than such carbon material as graphite, a negative electrode active material having a theoretical capacity density exceeding 833 $mAh/cm^3$ and capable of reversibly storing and releasing lithium ions, such as silicon (Si) and tin (Sn), can be used. Such a negative electrode active material can exert the advantage of the present invention, even when the material is any one of an elemental substance, alloy, compound, solid solution, and complex active material containing silicon material or tin material. In other words, as examples of the silicon-containing material, Si and $SiO_x$ (0<x<2.0), and an alloy, compound, and solid solution of one of these substances in which a part of Si is substituted with at least one element selected from a group consisting of Al, In, Cd, Bi, Sb, B, Mg, Ni, Ti, Mo, Co, Ca, Cr, Cu, Fe, Mn, Nb, Ta, V, W, Zn, C, N, and Sn can be used. As examples of tin-containing material, $Ni_2Sn_4$, $Mg_2Sn$, $SnOx$ (0<x<2.0), $SnO_2$, $SnSiO_3$, and LiSnO can be used. The shape of these negative electrode active materials is not specifically limited, and any given shape such as a fine particle, columnar body, and film can be used. These negative electrode active materials can be made of a single active material or a plurality of kinds of active materials.

By using negative electrode 13 made by the above manufacturing method, this non-aqueous electrolyte secondary battery has large capacity and excellent charge/discharge cycle characteristics.

As described above, the use of a method and apparatus of manufacturing a negative electrode for a non-aqueous electrolyte secondary battery of the present invention allows mass production of non-aqueous electrolyte secondary batteries having large capacity, excellent charge/discharge cycle characteristics, and few variations in these characteristics. For this reason, the present invention is useful for a secondary battery in applications from portable electronic devices for which great demand is expected in the future, such as a portable telephone, notebook PC, and a personal digital assistant (PDA), to a large electronic device.

What is claimed is:

1. A method of processing a precursor of a negative electrode for a non-aqueous electrolyte secondary battery, the method including imparting lithium to the precursor of the negative electrode capable of storing and releasing lithium, by a film forming method in a dry process, the imparting lithium comprising:
    (A) bringing the precursor into contact with a measuring terminal having a non-aqueous electrolyte and a counter electrode;
    (B) calculating an amount of lithium stored in the precursor from an open circuit potential of the precursor with respect to the counter electrode; and
    (C) controlling an amount of lithium to be imparted to the precursor according to the calculated amount of stored lithium.

2. The processing method according to claim 1, wherein the film forming method is vacuum deposition.

3. The processing method according to claim 1, wherein the non-aqueous electrolyte is a solid electrolyte.

4. The processing method according to claim 1, wherein the precursor includes a silicon-containing material as an active material thereof.

5. The processing method according to claim 4, wherein the silicon-containing material is a silicon oxide expressed by $SiO_x$ (0.3≦x≦1.3).

6. Apparatus of processing a negative electrode for a non-aqueous electrolyte secondary battery, comprising:
- a film forming part in a dry process configured to impart lithium to a precursor of the negative electrode capable of storing and releasing lithium;
- a measuring terminal to be brought into contact with the precursor and having a non-aqueous electrolyte and a counter electrode; and
- a controller configured to calculate an amount of lithium stored in the precursor from an open circuit potential of the precursor with respect to the counter electrode, and control the film forming part according to the calculated amount of stored lithium so as to control an amount of lithium to be imparted to the precursor.

7. A method of manufacturing a negative electrode for a non-aqueous electrolyte secondary battery, the method comprising:
(i) fabricating a precursor of the negative electrode including an active material capable of storing and releasing lithium; and
(ii) imparting lithium to the precursor by a film forming method in a dry process, the imparting lithium comprising:
(A) bringing the precursor into contact with a measuring tetininal having a non-aqueous electrolyte and a counter electrode;
(B) calculating an amount of lithium stored in the precursor from an open circuit potential of the precursor with respect to the counter electrode; and
(C) controlling an amount of lithium to be imparted to the precursor according to the calculated amount of stored lithium.

8. The manufacturing method according to claim 7, wherein the film forming method is vacuum deposition.

9. The manufacturing method according to claim 7, wherein the non-aqueous electrolyte is a solid electrolyte.

10. The manufacturing method according to claim 7, wherein the precursor includes a silicon-containing material as the active material.

11. The manufacturing method according to claim 10, wherein the silicon-containing material is a silicon oxide expressed by $SiO_x$ ($0.3 \leq x \leq 1.3$).

12. Apparatus of manufacturing a negative electrode for a non-aqueous electrolyte secondary battery, comprising:
- an active material layer forming part configured to fabricate a precursor of the negative electrode capable of storing and releasing lithium;
- a film forming part in a dry process configured to impart lithium to a precursor of the negative electrode capable of storing and releasing lithium;
- a measuring terminal to be brought into contact with the precursor and having a non-aqueous electrolyte and a counter electrode; and
- a controller configured to calculate an amount of lithium stored in the precursor from an open circuit potential of the precursor with respect to the counter electrode, and control the film forming part according to the calculated amount of stored lithium so as to control an amount of lithium to be imparted to the precursor.

* * * * *